United States Patent
Yang et al.

(10) Patent No.: US 9,203,749 B2
(45) Date of Patent: Dec. 1, 2015

(54) SYSTEM, DEVICES AND METHODS FOR FACILITATING COEXISTENCE OF VLAN LABELING AND FINE-GRAINED LABELING RBRIDGES

(71) Applicant: Cisco Technology, Inc., San Jose, CA (US)

(72) Inventors: Yibin Yang, San Jose, CA (US); Chiajen Tsai, Cupertino, CA (US); Liqin Dong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 13/904,065

(22) Filed: May 29, 2013

(65) Prior Publication Data

US 2014/0355475 A1    Dec. 4, 2014

(51) Int. Cl.
*H04L 12/721*    (2013.01)
*H04L 12/753*    (2013.01)

(52) U.S. Cl.
CPC ............... *H04L 45/66* (2013.01); *H04L 45/48* (2013.01)

(58) Field of Classification Search
CPC ..................................................... H04L 45/02
USPC ...................................................... 370/254
See application file for complete search history.

(56) References Cited

PUBLICATIONS

Eastlake, D., et al. "TRILL: Fine-Grained labeling, "TRILL working group, Jun. 9, 2012, 22 pages.*
Perlman, R., et al., RBridges: Base Protocol Specification, TRILL Working Group, Mar. 3, 2010, 118 Pages.*
Eastlake, D., et al., "TRILL: Fine-Grained Labeling," Internet draft, <draft-ietf-trill-fine-labeling-01.txt>, TRILL Working Group, Jun. 9, 2012, 22 pages.
Perlman, R., et al., "RBridges: Base Protocol Specification," Internet draft, <draft-ietf-trill-rbridge-protocol-16.txt>, TRILL Working Group, Mar. 3, 2010, 118 pages.

* cited by examiner

*Primary Examiner* — Dang Ton
*Assistant Examiner* — Mewale Ambaye
(74) *Attorney, Agent, or Firm* — Meunier Carlin & Curfman LLC

(57) ABSTRACT

An example method for calculating a constrained distribution tree in a TRILL network including a plurality of VL and FGL RBridges can include learning an FGL multi-destination frame filtering capability of at least one of the FGL RBridges in the TRILL network, constructing a sub-graph including the FGL RBridges and associated links and calculating at least one sub-tree based on the sub-graph. The method can also include constructing a graph including VL RBridges, the FGL RBridges and associated links by adding links between the VL RBridges and the FGL RBridges. The FGL RBridge to which the VL RBridge is linked can have sufficient FGL multi-destination frame filtering capability. Further, the method can include calculating a constrained distribution tree based on the graph by treating the sub-tree as a logical node.

20 Claims, 6 Drawing Sheets

300

Learn an FGL multi-destination frame filtering capability of at least one FGL RBridge in a TRILL network through a link state protocol
302

Construct a sub-graph including the FGL RBridges and associated links
304

Calculate at least one sub-tree based on the sub-graph
306

Construct a graph including one or more VL RBridges, the FGL RBridges and associated links by adding one or more links between the VL RBridges and the FGL RBridges based on the bordering capabilities of the FGL RBridges
308

Calculate a constrained distribution tree based on the graph by treating the sub-tree as a logical node
310

FIG. 3

SYSTEM, DEVICES AND METHODS FOR FACILITATING COEXISTENCE OF VLAN LABELING AND FINE-GRAINED LABELING RBRIDGES

BACKGROUND

IETF Transparent Interconnect of Lots of Links ("TRILL") provides an architecture of Layer 2 control and forwarding that provides benefits such as pair-wise optimal forwarding, loop mitigation, multipathing and provisioning free. The TRILL protocol is described in detail in Perlman et al., "RBridges: Base Protocol Specification," available at http://tools.ietf.org/html/draft-ietf-trill-rbridge-protocol-16. The TRILL base protocol supports approximately four-thousand customer (or tenant) identifications through the use of inner virtual local area network ("VLAN") tags. For example, according to the TRILL protocol, the TRILL header includes a single, 12-bit VLAN tag. The number of tenant identifications provided by the TRILL base protocol is insufficient for large multi-tenant data center deployments. Thus, a fine-grained labeling ("FGL") networking scheme has been proposed to increase the number of tenant identifications to approximately sixteen million through the use of two inner VLAN tags. The FGL networking scheme is described in detail in Eastlake et al., "TRILL: Fine-Grained Labeling," available at http://tools.ietf.org/html/draft-ietf-trill-fine-labeling-01 (hereinafter "Eastlake"). For example, according to the TRILL FGL protocol, two, 12-bit VLAN tags (e.g., a high-order VLAN tag and a low-order VLAN tag) are included in the TRILL header.

A TRILL network can include RBridges configured to support the TRILL base protocol (e.g., VLAN labeling ("VL") RBridges) and RBridges configured to support the TRILL FGL protocol (e.g., FGL RBridges). It should be understood that the hardware of a VL RBridge is not configured to handle FGL frames. Although the hardware of a VL RBridge cannot handle FGL frames, it is possible to run an updated version of software in the VL RBridge to allow it to coexist with FGL RBridges in the same TRILL network. A TRILL network where VL and FGL RBridges coexist can result from gradually replacing VL RBridges with FGL RBridges or by merging two TRILL networks having VL and FGL RBridges, respectively.

Security issues, however, can arise in a TRILL network including VL and FGL RBridges where both VLAN X and FGL (X.Y) are used. First, a multi-destination frame with FGL (X.Y) might follow a distribution tree and egress from a VL RBridge interested in VLAN X. Second, an end station connecting to a VL RBridge interested in VLAN X might forge a multi-destination frame with FGL (X.Y) by sending it with EX-TAG Y. In either case, the multi-destination frame might leak between one tenant in FGL (X.Y) and another tenant in VLAN X. A solution to the above security concerns has been proposed by configuring FGL RBridges to prohibit ingressing and egressing frames to/from FGL (X.Y) if VLAN X is connected to any one of the VL RBridges. These security concerns and proposed solution are discussed in detail in Sections 4 and 9 of Eastlake, for example. Although the proposed solution addresses the security concerns, it disallows the coexistence of approximately four thousand fine-grained labels (e.g., FGL (X.*)) for every VLAN (e.g., VLAN X) connected to one of the VL RBridges. Thus, when a large number of VLANs are connected to the VL RBridges, there may not be enough fine-grained labels available for new tenants.

SUMMARY

Methods, systems and devices for calculating a constrained distribution trees are provided herein. Optionally, the methods, systems and devices facilitate co-existence of VLAN labeling and FGL RBridges in a TRILL network. For example, the constrained distribution trees can account for the bordering capabilities or FGL multi-destination frame filtering capabilities of packet-switching devices such as FGL RBridges, for example. By accounting for the bordering capabilities, it is possible to calculate constrained distribution trees that prevent traffic from leaking between nodes in a VLAN labeling network and nodes in an FGL network.

An example method for calculating a constrained distribution tree in a TRILL network including a plurality of VL and FGL RBridges can include learning an FGL multi-destination frame filtering capability of at least one of the FGL RBridges in the TRILL network, constructing a sub-graph including the FGL RBridges and associated links and calculating at least one sub-tree based on the sub-graph. The method can also include constructing a graph including one or more VL RBridges, the FGL RBridges and associated links by adding one or more links between the VL RBridges and the FGL RBridges. Each FGL RBridge to which a VL RBridge is linked can have sufficient FGL multi-destination frame filtering capability. Further, the method can include calculating a constrained distribution tree based on the graph by treating the sub-tree as a logical node.

Optionally, in order to learn an FGL multi-destination frame filtering capability of at least one of the FGL RBridges in the TRILL network, the method can include transmitting or receiving a message using a link state protocol. For example, the message can include an RBridge nickname and a level of FGL multi-destination frame filtering capability associated with an FGL RBridge. Optionally, the link state protocol can be a TRILL intermediate system to intermediate system ("IS-IS") link state protocol.

Alternatively or additionally, an FGL RBridge can have one of a plurality of levels of FGL multi-destination frame filtering capabilities. The level of FGL multi-destination frame filtering capability that is sufficient can depend on the network topology. An FGL RBridge having a first level of FGL multi-destination frame filtering capability can be configured to detect and discard a multi-destination FGL frame. In contrast, an FGL RBridge having a second level of FGL multi-destination frame filtering capability can be configured to detect a multi-destination FGL frame and extract a higher-order portion of an FGL header of the multi-destination FGL frame. Then, the FGL RBridge can be configured to compare the higher-order portion of the FGL header to at least one VLAN identifier of a VLAN connected to the VL RBridge and, if the higher-order portion of the FGL header matches the at least one VLAN identifier, discard the multi-destination FGL frame.

When the sub-graph including the FGL RBridges and associated links is made of a single partition, an FGL RBridge having at least one of the first and second levels of FGL multi-destination frame filtering capability provides sufficient FGL multi-destination frame filtering capability. In contrast, when the sub-graph including the FGL RBridges and associated links is made of a plurality of partitions, an FGL RBridge having a second level of FGL multi-destination frame filtering capability provides sufficient FGL multi-destination frame filtering capability.

Optionally, when the sub-graph including the FGL RBridges and associated links includes a plurality of partitions, the method can further include calculating a plurality of sub-trees based on the sub-graph, each sub-tree corresponding to one of the partitions of the sub-graph. Additionally, when calculating a constrained distribution tree based on the graph, each of the sub-trees can be treated as a different logical node.

Alternatively or additionally, the method can optionally include detecting a unicast FGL frame, determining at least one of an ingress RBridge and an egress RBridge based on a TRILL header of the unicast FGL frame and, if the at least one of the ingress and egress RBridges is a VL RBridge, discarding the unicast FGL frame.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 is a flow diagram illustrating example operations for calculating a constrained distribution tree.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for calculating a constrained distribution tree to facilitate coexistence of VLAN labeling and FGL RBridges in a TRILL network, it will become evident to those skilled in the art that the implementations are not limited thereto. For example, one of ordinary skill in the art would understand that the implementations are applicable to facilitating coexistence of networking devices configured according to other proprietary or standard protocols providing an architecture of Layer 2 control and forwarding such as FabricPath of CISCO SYSTEMS, INC. of SAN JOSE, Calif.

Figure 1:
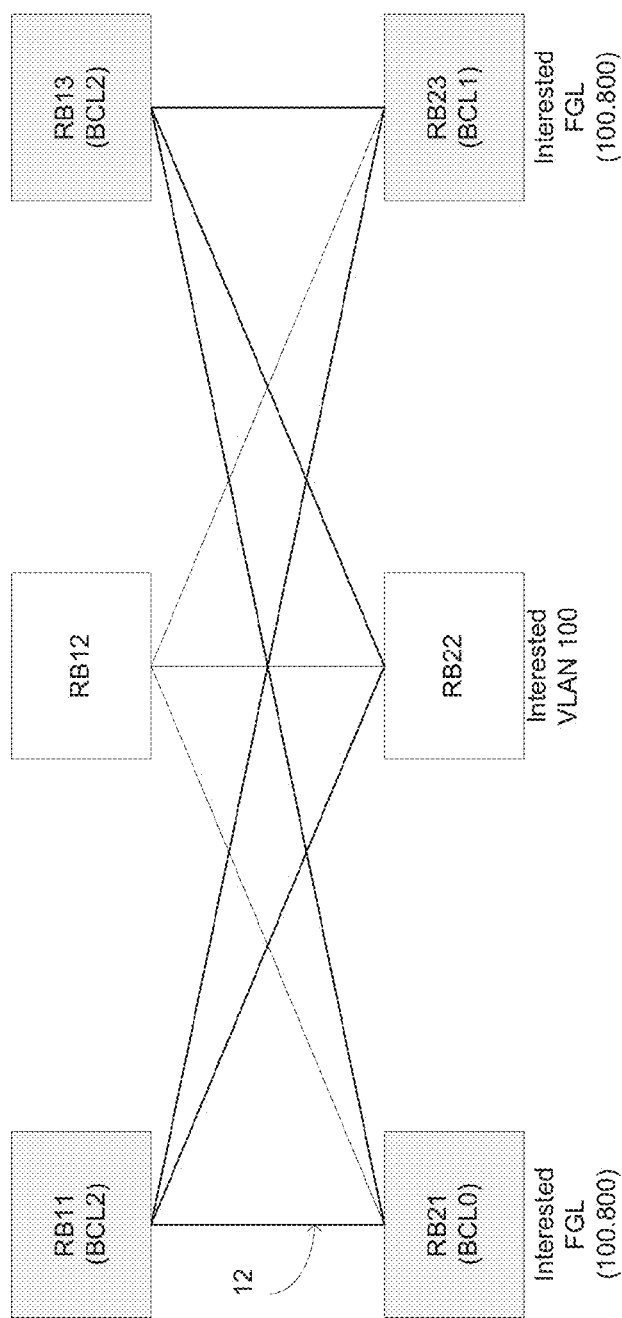
FIG. 1 is a block diagram illustrating an example TRILL network according to implementations discussed herein.

Referring now to FIG. 1, a block diagram illustrating an example TRILL network 10 is shown. The network 10 can include RBridges RB11, RB12, RB13, RB21, RB22 and RB23. It should be understood that other network nodes (e.g., client, servers, computing devices, etc.) can be connected to the TRILL network 10 through one or more of RBridges RB11, RB12, RB13, RB21, RB22 and RB23. The RBridges can be communicatively connected through one or more communication links. This disclosure contemplates the communication links are any suitable communication link. For example, a communication link may be implemented by any medium that facilitates data exchange between the network elements including, but not limited to, wired, wireless and optical links. It should be understood that the TRILL network 10 shown in FIG. 1 is provided only as an example. A person of ordinary skill in the art may provide the functionalities described herein in a network having more or less elements than shown in FIG. 1.

RBridges are packet-forwarding devices (e.g., switches, bridges, etc.) that are configured to implement the TRILL protocol. According to the TRILL protocol, RBridges are configured to exchange link state information using a link state protocol such as a TRILL IS-IS link state protocol, for example. The TRILL protocol is well-known in the art and is therefore not discuss in further detail herein. TRILL links 12 between the RBridges are shown in FIG. 1. In addition, each of RBridges RB11, RB13, RB21 and RB23, which are shaded in FIG. 1, can be configured to support TRILL FGL. Thus, RBridges RB11, RB13, RB21 and RB23 are referred to as "FGL RBridges" herein. RBridges RB11, RB13, RB21 and RB23 can advertise their ability to support TRILL FGL using a link state protocol (e.g., TRILL IS-IS link state protocol). As discussed above, according to TRILL FGL, two inner VLAN tags are used to increase the number of available tenant identifications as compared to the number of tenant identifications available using the TRILL base protocol. Specifically, instead of including a single, 12-bit VLAN tag in the TRILL header, two, 12-bit VLAN tags (e.g., a high-order VLAN tag and a low-order VLAN tag) are included in the TRILL header according to TRILL FGL. The high-order and low-order VLAN tags are denoted as FGL (X.Y) below, where "X" denotes the high-order VLAN tag and "Y" denotes the low-order VLAN tag. Additionally, RBridges RB12 and RB22 can be configured to support the TRILL base protocol. Thus, RBridges RB12 and RB22 are referred to as "VLAN labeling RBridges" or "VL RBridges" herein. As discussed above, according to the TRILL base protocol, a single, 12-bit VLAN tag is included in the TRILL header. It should be understood that the VL RBridges are not configured to handle FGL frames. Additionally, as shown in FIG. 1, FGL RBridges RB21 and RB23 have FGL (100.800) connectivity and VL RBridge RB22 has VLAN 100 connectivity.

When a TRILL network includes both FGL and VL RBridges, security concerns may exist. For example, with reference to FIG. 1, a multi-destination frame with FGL (100.800) ingressing on FGL RBridge RB21 may follow a distribution tree and reach VL RBridge RB22. VL RBridge RB22 considers this frame as belonging to VLAN 100 and egresses the frame to its end hosts in VLAN 100. This causes information leaking from one tenant in FGL (100.800) to another tenant in VLAN 100, which is unacceptable. Additionally, a VLAN 100 end station attached to VL RBridge RB22 may send a multi-destination frame with EX-TAG of 800 to VL RBridge RB22. VL RBridge RB22 considers this frame as an untagged frame, e.g., as EX-TAG ethertype 0x893B, which is not recognizable by a VL RBridge. Thus, VL RBridge RB22 pushes a tag of VLAN 100 into the frame and sends it over a distribution tree. Eventually, FGL RBridges RB21 and RB23 receive this frame and consider it as belonging to FGL (100.800) and egress the frame to their end hosts in FGL (100.800), which causes a security breach.

To facilitate coexistence of VL and FGL RBridges, a constrained distribution tree calculation is provided herein. The constrained distribution tree calculation accounts for RBridge capabilities such as FGL multi-destination frame filtering capability, for example, during the calculation. Thus, the constrained distribution tree allows for better coexistence between the VL and FGL RBridges in the TRILL network.

FGL RBridges can be configured to perform FGL multi-destination frame filtering on one or more ports bordering VL RBridges. This is also referred to as the bordering capabilities of the FGL RBridges herein. This disclosure contemplates that there can be a plurality of different levels of bordering capability. For example, bordering capability levels 0 through 2 are discussed herein (e.g., BCL0, BCL1 and BCL2). As shown in FIG. 1, FGL RBridge RB21 is a BCL0 FGL RBridge, FGL RBridge RB23 is a BCL1 FGL RBridge and FGL RBridges RB11 and RB13 are BCL2 FGL RBridges. The characteristics of BCL0 through BCL2 are provided below.

A BCL0 FGL RBridge (e.g., FGL RBridge RB21 in FIG. 1) is incapable of performing FGL multi-destination frame filtering on its ports. Additionally, a BCL1 FGL RBridge (e.g., FGL RBridge RB23 in FIG. 1) can be configured to detect and block ingressing/egressing of FGL multi-destination frames on its ports bordering VL RBridges. In other words, for a TRILL multi-destination frame incoming or outgoing on a bordering port, a BCL1 FGL RBridge can detect/determine whether the multi-destination frame is an FGL frame, and if so, discard the FGL frame. The BCL1 FGL RBridge does not need to know the content of the fine-grained label associated with the FGL frame. BCL1 FGL RBridges can optionally be used in the case when VL RBridges are in the leaf branches of a distribution tree, which is discussed in further detail below with regard to FIGS. 2A-2C. It should be understood that level 1 bordering capability can be supported by the forwarding hardware of one or more of the FGL RBridges.

Further, a BCL2 FGL RBridge (e.g., FGL RBridges RB11 and RB13 in FIG. 1) can be configured to detect and block ingressing and egressing of FGL multi-destination frames based on a higher-order portion of the fine-grained label of the FGL frame on its ports bordering VL RBridges. Optionally, the higher-order portion of the fine-grained label can be the high-order VLAN tag (e.g., the high-order 12-bit VLAN tag discussed above). In other words, for an incoming or outgoing TRILL multi-destination frame on a bordering port, a BCL2 FGL RBridge can detect/determine whether the multi-destination frame is a FGL frame, and if so, extract the higher-order portion of the fine-grained label. Then, a BCL2 FGL RBridge can compare the higher-order portion of the fine-grained label with the VLANs connected to VL RBridges in the TRILL network (e.g., the VLANs VL-specifiable in the TRILL network). When the higher-order portion of the fine-grained label matches one of the VLANs, a BCL2 FGL RBridge discards the FGL frame. BCL2 FGL RBridges are optionally used in the case when VL Bridges serve as transit between FGL RBridge partitions, which is discussed in further detail below with regard to FIGS. 2A-2C. It should be understood that a BCL2 FGL RBridge can function as a BCL1 FGL RBridge by treating all possible VLANs (e.g., approximately four thousand possible VLANs) as connected to VL RBridges in the TRILL network. It should also be understood that level 2 bordering capability can be supported by the forwarding hardware of one or more of the FGL RBridges.

FGL RBridges (e.g., RBridges RB11, RB12, RB13, RB21, RB22 and RB23) in a TRILL network can exchange their respective levels of bordering capability using a link state protocol. Optionally, this information can be included in a type length value ("TLV") of the link state protocol. This TLV is also referred to as the Bordering Capability TLV below. The Bordering Capability TLV can optionally include the RBridge nickname of an FGL RBridge and its bordering capability level (e.g., BCL0-BCL2), for example. It should be understood that each of the FGL RBridges has a unique RBridge nickname. Therefore, each of the FGL RBridges in the TRILL network can learn the bordering capabilities of the other FGL RBridges in the TRILL network by exchanging link state information including the Bordering Capability TLVs. Optionally, as discussed above, the link state protocol can be a TRILL IS-IS link state protocol. This disclosure also contemplates that the link state protocol can be any other standard or proprietary protocol for exchanging link state information and the TRILL IS-IS link state protocol is provided only as an example.

Constrained Distribution Tree Calculation

After the bordering capabilities of the FGL RBridges (e.g., FGL RBridges RB11, RB13, RB21 and RB23) are distributed throughout the TRILL network (e.g., TRILL network 10), a constrained distribution tree can be calculated that accounts for the bordering capabilities of the FGL RBridges in the TRILL network. Optionally, the constrained distribution tree can be calculated by one or more of the VL or FGL RBridges.

To calculate a constrained distribution tree, a sub-graph including the FGL RBridges and links therebetween is constructed. Optionally, the sub-graph includes only the FGL RBridges (and therefore does not include VL RBridges). Then, a sub-tree is calculated based on the sub-graph. If there are multiple partitions in the sub-graph (e.g., as shown in FIG. 2C), then a plurality of sub-trees can be calculated. In other words, a sub-tree can be calculated for each partition of the sub-graph. The VL RBridges and the links therebetween are then added. Thereafter, one or more VL RBridges and the links between them are added to the graph. Then, for a link connecting a VL RBridge and an FGL RBridge, the link is added provided that the FGL RBridge is configured with sufficient bordering capability. For example, when there is a single sub-tree, the FGL RBridge is required to be a BCL1 or BCL2 FGL RBridge. Alternatively or additionally, when there are a plurality of sub-trees, the FGL RBridge is required to be a BCL2 FGL RBridge. As discussed above, there are multiple sub-trees when the sub-graph including the FGL RBridges includes a plurality of partitions. If the graph including the sub-tree(s) and the VL RBridges is connected, then a constrained distribution tree can be calculated by treating each sub-tree as a logical node. It should be understood that if the graph includes a plurality of sub-trees, the security concerns can also be addressed by prohibiting the FGL RBridges from ingressing and egressing frames with FGL (X.Y) when VLAN X is connected to any VL RBridge in the TRILL network.

The constrained distribution tree can prevent the security concerns resulting from VL and FGL RBridges coexisting in the same TRILL network. For example, by computing a sub-tree including only FGL RBridges, each partition of the sub-graph localizes its FGL multi-destination traffic without using any VL RBridge for transit. Additionally, by adding a link connecting a VL RBridge and an FGL RBridge only if the FGL RBridge has sufficient bordering capability, FGL multi-destination frames can be properly filtered by the bordering FGL RBridges so that the security concerns are alleviated (e.g., no information leaks between a tenant in FGL (X.Y) and a tenant in VLAN X). Further, if the sub-graph including only FGL RBridges is disconnected, BCL2 FGL RBridges can restrict the multi-destination traffic of FGL (X.Y) within each partition, given VLAN X is connected to one of the VL RBridges. In the case that FGL (X.Y) is connected to FGL RBridges within one partition only (e.g., as shown in FIG.

2C), the security concerns are alleviated. However, if FGL (X.Y) is connected to FGL RBridges in multiple partitions, its broadcast domain becomes disjoint. In this case, a command line interface ("CLI") can be provided to allow an administrator to either allow a disjoint broadcast domain or fall back to the solution where the FGL RBridges prohibit ingressing and egressing frames with FGL (X.Y) when VLAN X is connected to any VL RBridge in the TRILL network.

Optionally, in addition to providing constrained multi-destination forwarding, the FGL RBridges (e.g., FGL RBridges RB11, RB13, RB21 and RB23) can be configured to restrict unicast forwarding. The FGL RBridges can be configured to detect and discard unicast FGL frames if the ingress or egress RBridge is a VL RBridge, for instance, based on a TRILL header of the unicast FGL frame. For example, an egress FGL RBridge can be configured to detect and discard an FGL unicast frame whose ingress RBridge is a VL RBridge. Additionally, an ingress FGL RBridge can be configured to detect and discard an FGL unicast frame whose egress RBridge is a VL RBridge. Alternatively or additionally, a transit FGL RBridge can be configured to detect and discard an FGL unicast frame whose ingress or egress RBridge is a VL RBridge.

Figure 2A:
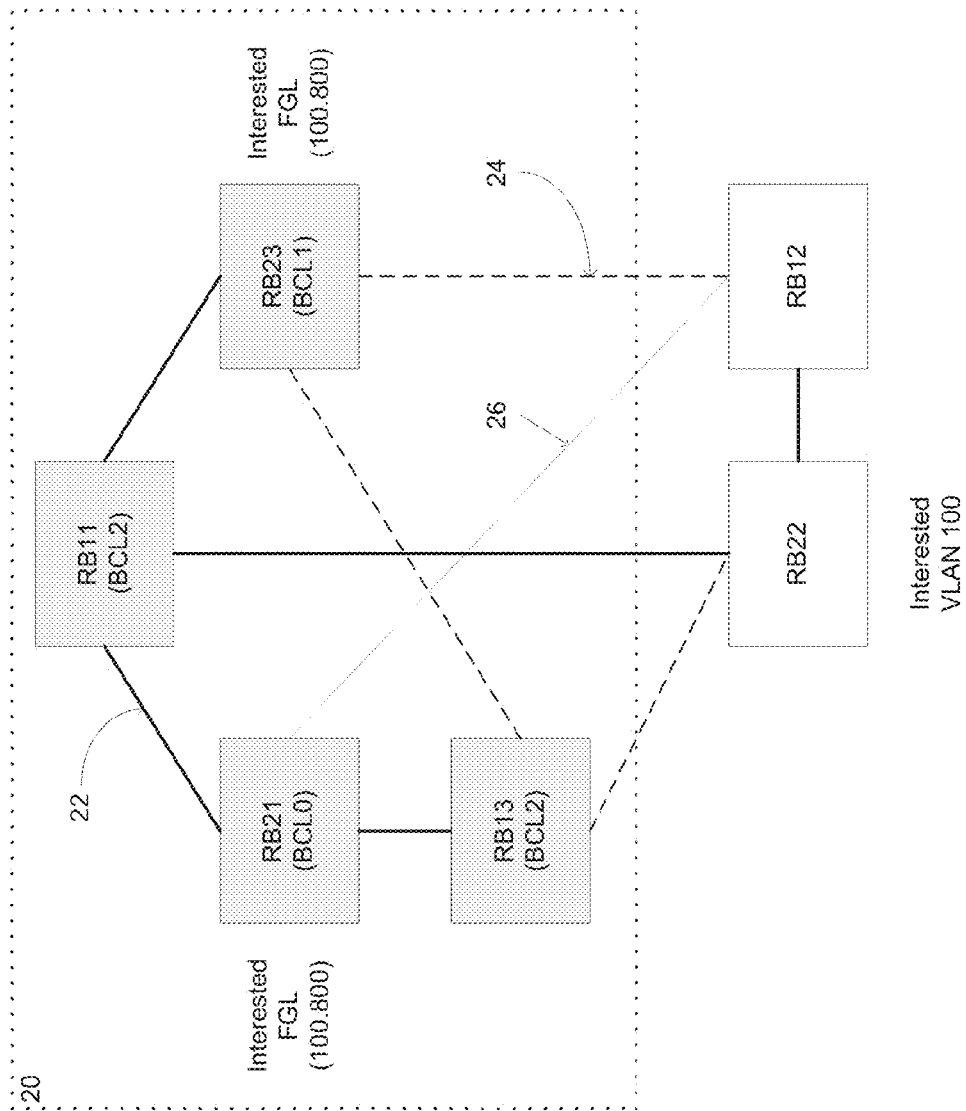
FIGS. 2A-2C are block diagrams illustrating example constrained distribution tree calculations.
Figure 2B:
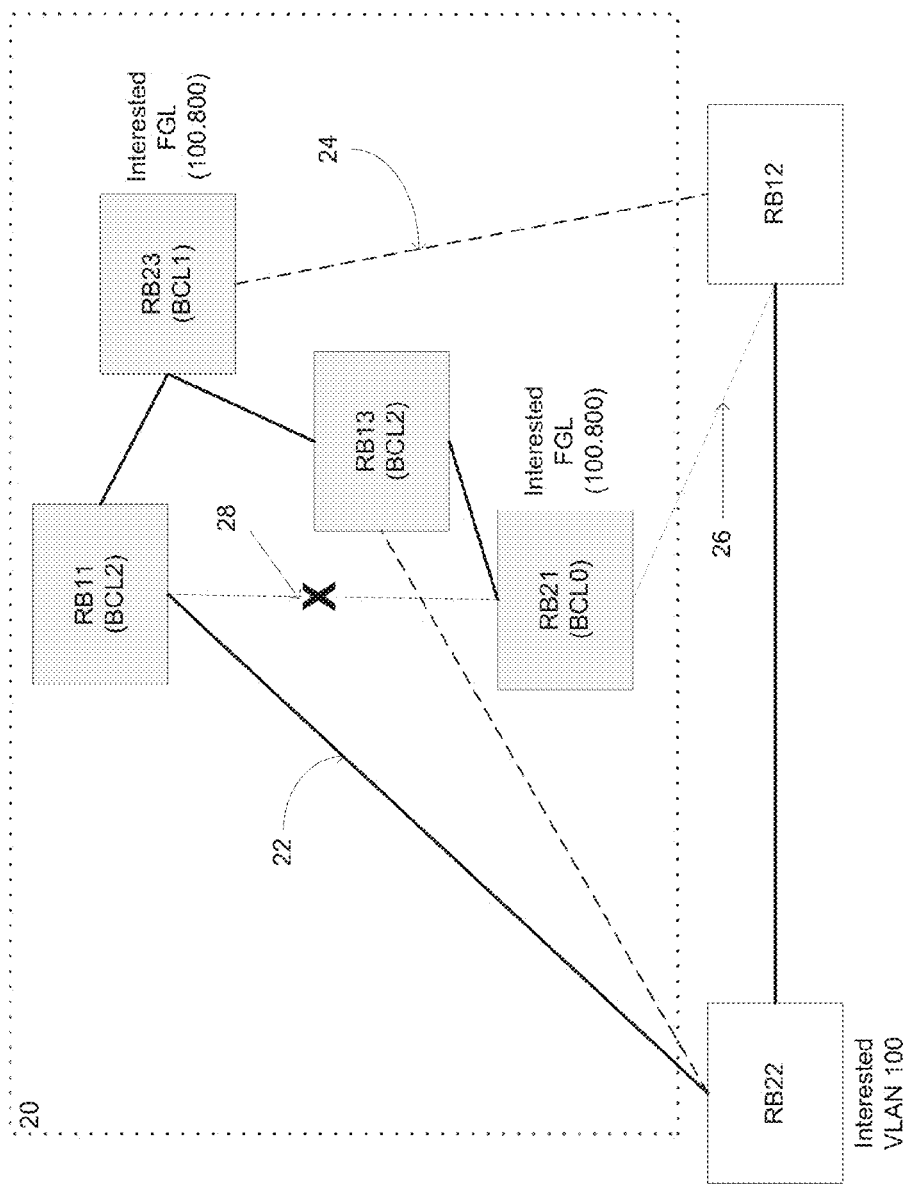
Figure 2C:
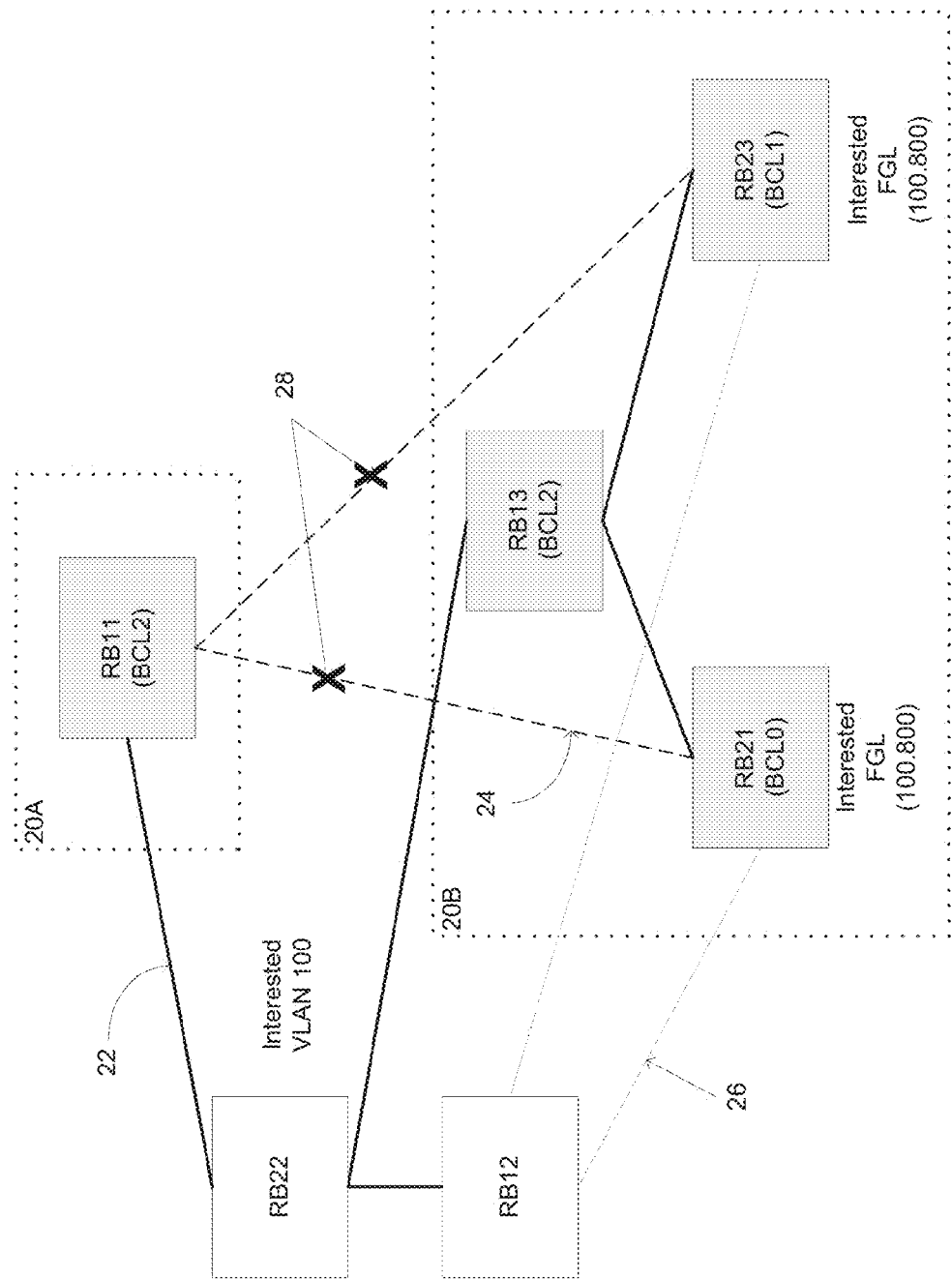

Referring now to FIGS. 2A-2C, block diagrams illustrating example constrained distribution tree calculations are shown. The examples illustrated in FIGS. 2A-2C use the two-tier fat tree network topology of FIG. 1 to demonstrate the effectiveness of the constrained distribution tree calculation. It should be understood that the constrained distribution tree calculation can also be applied to arbitrary network topologies. Additionally, in the examples, all links between the RBridges are assumed have the same cost and RBridges with lower RBridge nicknames are preferred during tie breakings. These assumptions are made only for the purposes of the examples and are not intended to be limiting.

FIG. 2A illustrates an example constrained distribution tree calculation when there is no broken link. First, a sub-graph including FGL RBridges RB11, RB13, RB21 and RB23, as well as the links between them, is constructed. Thereafter, a sub-tree rooted at FGL RBridge RB11 is calculated. Then, VL RBridges RB12 and RB22 along with the link between them (e.g., link {RB12, RB22}) are added. In FIG. 2A, because there is a single sub-tree, FGL RBridges having BCL1 or BCL2 have adequate bordering or FGL multi-destination frame filtering capability. Accordingly, three links between VL RBridges and FGL RBridges (e.g., links {RB22, RB11}, {RB22, RB13} and {RB12, RB23}) can be added back because FGL RBridges RB11, RB13 and RB23 are BCL1 or BCL2 FGL RBridges. However, the link between VL RBridge RB12 and FGL RBridge RB21 (e.g., link {RB12, RB21}) cannot be added back because FGL RBridge RB21 is a BCL0 FGL RBridge and does not have sufficient bordering capability. A constrained distribution tree calculation can then be performed on the graph including VL RBridges RB12 and RB22 and the sub-tree including RBridges RB11, RB13, RB21 and RB23, which is treated as logical node 20 for the purposes of the calculation. In FIG. 2A, the links 22 selected by the constrained distribution tree calculation are shown as solid lines, the links 24 not selected by the constrained distribution tree calculation are shown as dashed lines and the link 26 not added due to the insufficient bordering capability of FGL RBridge RB21 is shown as a dotted line. As shown in FIG. 2A, the constrained distribution tree can prevent multi-destination frames from leaking between VLAN 100 and FGL (100.800) through FGL RBridge RB11's ability to filter FGL multi-destination frames. Therefore, VLAN 100 and FGL (100.800) can coexist in the TRILL network.

FIG. 2B illustrates an example constrained distribution tree calculation when the link between FGL RBridge RB11 and FGL RBridge RB21 (e.g., link {RB11, RB21}) is broken. The broken link is illustrated by reference numeral 28 in FIG. 2B. The sub-graph including FGL RBridges RB11, RB13, RB21 and RB23 is connected, and a single sub-tree rooted at FGL RBridge RB11 can be calculated. Then, similar to the example calculation discussed with regard to FIG. 2A, three links between VL RBridges and FGL RBridges (e.g., links {RB22, RB11}, {RB22, RB13} and {RB12, RB23}) can be added back because FGL RBridges RB11, RB13 and RB23 are BCL1 or BCL2 FGL RBridges. However, the link between VL RBridge RB12 and FGL RBridge RB21 (e.g., link {RB12, RB21}) cannot be added back because FGL RBridge RB21 is a BCL0 FGL RBridge and does not have sufficient bordering capability. A constrained distribution tree calculation can then be performed on the graph including VL RBridges RB12 and RB22 and the sub-tree including RBridges RB11, RB13, RB21 and RB23, which is treated as logical node 20 for the purposes of the calculation. In FIG. 2B, the links 22 selected by the constrained distribution tree calculation are shown as solid lines, the links 24 not selected by the constrained distribution tree calculation are shown as dashed lines and the link 26 not added due to the insufficient bordering capability of FGL RBridge RB21 is shown as a dotted line. This distribution tree also allows VLAN 100 and FGL (100.800) to coexist in the same TRILL network.

FIG. 2C illustrates an example constrained distribution tree calculation when the links between RBridge RB11 and RB21 (e.g., link {RB11, RB21}) and between RBridge RB11 and RB23 (e.g., link {RB11, RB23}) are broken. The broken links are illustrated by reference numeral 28 in FIG. 2C. The sub-graph including FGL RBridges RB11, RB13, RB21 and RB23 is constructed, but unlike FIGS. 2A and 2B, the sub-graph is disconnected. In other words, the sub-graph includes a plurality of partitions. Accordingly, two sub-trees are calculated, each sub-tree being calculated based on a partition of the sub-graph. Then, VL RBridges RB12 and RB22 along with the link between them (e.g., link {RB12, RB22}) are added. Because there a plurality of sub-trees, an FGL RBridge has sufficient bordering capability when it is a BCL2 FGL RBridge only. Thus, two links between VL RBridges and FGL RBridges (e.g., links {RB22, RB11} and {RB22, RB13}) can be added back because FGL RBridges RB11 and RB13 are BCL2 FGL RBridges. However, the links between VL RBridge RB12 and FGL RBridges RB21 and RB23 (e.g., links {RB12, RB21} and {RB12, RB23}) cannot be added back because FGL RBridges RB21 and RB23 are BCL0 and BCL1 FGL RBridges, respectively, neither of which has sufficient bordering capability. A constrained distribution tree calculation can then be performed on the graph including VL RBridges RB12 and RB22 and the two sub-trees including RBridges RB11 and RBridges RB13, RB21 and RB23, which are treated as logical nodes 20A and 20B, respectively, for the purposes of the calculation. In FIG. 2C, the links 22 selected by the constrained distribution tree calculation are shown as solid lines, the links 24 not selected by the constrained distribution tree calculation are shown as dashed lines and the links 26 not added due to the insufficient bordering capability of FGL RBridges RB21 and RB23 are shown as dotted lines. As shown in FIG. 2C, the constrained distribution tree prevents frames from leaking between VLAN 100 and FGL (100.800) through FGL RBridges RB11's and RB13's ability to filter FGL frames based on the higher-order portion of the fine-grained labels of the FGL frames. Therefore, VLAN 100 and FGL (100.800) can coexist in the TRILL network. It should be understood that FGL RBridges RB11 and RB13 should not be BCL1 FGL RBridges because their indiscriminate filtering of FGL frames would block the traffic between logical nodes 20A and 20B for FGL frames with FGL (200.800), for example.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring now to FIG. 3, a flow diagram illustrating example operations 300 for calculating a constrained distribution tree is shown. It should be understood that the example operations 300 can be implemented in a TRILL network (e.g., TRILL network 10 shown in FIG. 1) including a plurality of VL and FGL RBridges, for example, by VL and FGL RBridges (e.g., VL and FGL RBridges RB11, RB12, RB13, RB21, RB22 and RB23). As discussed above, it is possible to run an updated version of software in a VL RBridge to allow it to coexist with FGL RBridges in the same TRILL network. Accordingly, the VL and FGL RBridges can be configured to calculate a constrained distribution tree, and the RBridges in the TRILL network can see the same distribution trees. Additionally, as discussed above, FGL RBridges can be configured to perform multi-destination frame filtering, which is a capability that is not supported by the hardware of the VL RBridges.

At 302, a FGL multi-destination frame filtering capability of at least one of the FGL RBridges in the TRILL network can be learned. For example, the FGL RBridges in the TRILL network can exchange their respective FGL multi-destination frame filtering capabilities using a link state protocol such as the TRILL IS-IS link state protocol. This information can optionally be included in a Bordering Capability TLV of the link state protocol as discussed above. At 304, a sub-graph including the FGL RBridges and associated links can be constructed. Then, at 306, at least one sub-tree can be calculated based on the sub-graph. When the sub-graph includes a plurality of partitions, a sub-tree can be calculated for each partition of the sub-graph. One or more VL RBridges and associated links can then be added back. At 308, a graph including one or more VL RBridges, the FGL RBridges and associated links can be constructed by adding one or more links between the VL RBridges and the FGL RBridges based on the bordering capabilities of the FGL RBridges. As discussed above, an FGL RBridge to which a VL RBridge is linked should have sufficient FGL multi-destination frame filtering capability if the link is to be added back. Then, at 310, a constrained distribution tree is calculated based on the graph by treating the sub-tree as a logical node.

Figure 4:
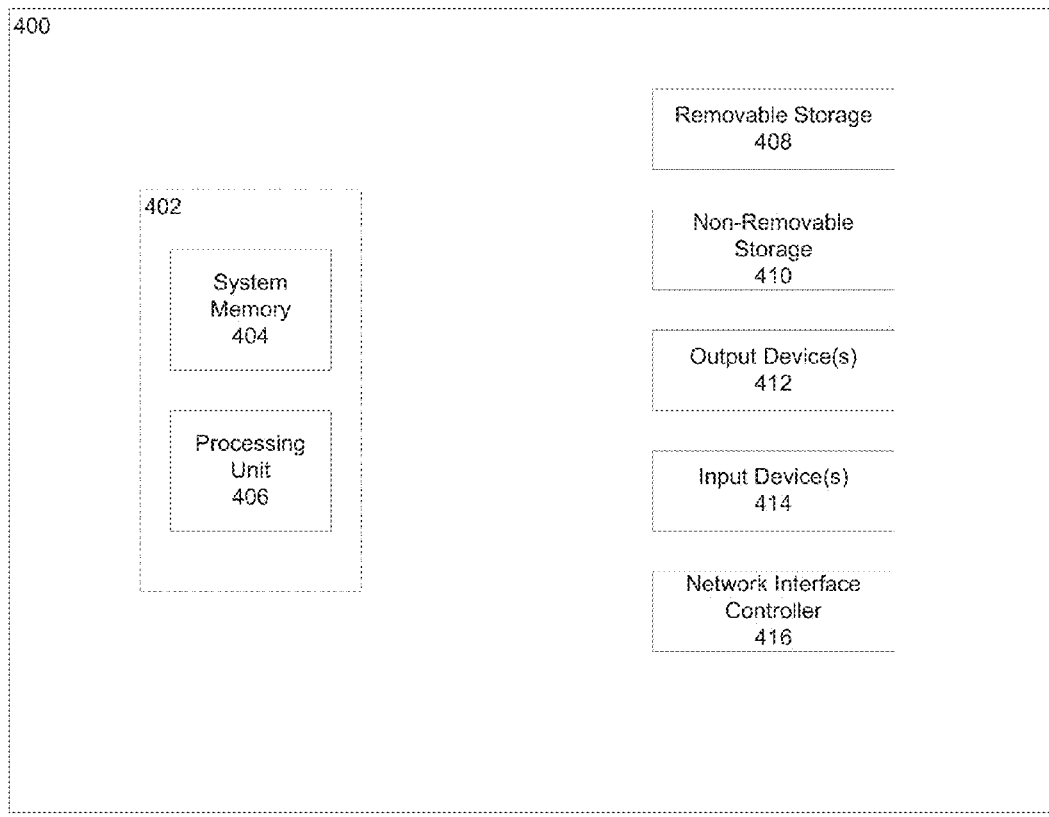
FIG. 4 is a block diagram illustrating an example computing device.

When the logical operations described herein are implemented in software, the process may execute on any type of computing architecture or platform. For example, referring to FIG. 4, an example computing device upon which embodiments of the invention may be implemented is illustrated. In particular, the RBridges discussed above may be a computing device, such as computing device 400 shown in FIG. 4. The computing device 400 may include a bus or other communication mechanism for communicating information among various components of the computing device 400. In its most basic configuration, computing device 400 typically includes at least one processing unit 406 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 402. The processing unit 406 may be a standard programmable processor that performs arithmetic and logic operations necessary for operation of the computing device 400. Alternatively or additionally, the processing unit 406 can be an ASIC.

Computing device 400 may have additional features/functionality. For example, computing device 400 may include additional storage such as removable storage 408 and non-removable storage 410 including, but not limited to, magnetic or optical disks or tapes. Computing device 400 may also contain network connection(s) 416 that allow the device to communicate with other devices. Computing device 400 may also have input device(s) 414 such as a keyboard, mouse, touch screen, etc. Output device(s) 412 such as a display, speakers, printer, etc. may also be included. The additional devices may be connected to the bus in order to facilitate communication of data among the components of the computing device 400. All these devices are well known in the art and need not be discussed at length here.

The processing unit 406 may be configured to execute program code encoded in tangible, computer-readable media. Computer-readable media refers to any media that is capable of providing data that causes the computing device 400 (i.e., a machine) to operate in a particular fashion. Various computer-readable media may be utilized to provide instructions to the processing unit 406 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 406 may execute program code stored in the system memory 404. For example, the bus may carry data to the system memory 404, from which the processing unit 406 receives and executes instructions. The data received by the system memory 404 may optionally be stored on the removable storage 408 or the non-removable storage 410 before or after execution by the processing unit 406.

Computing device 400 typically includes a variety of computer-readable media. Computer-readable media can be any available media that can be accessed by device 400 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 404, removable storage 408, and non-removable storage 410 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for calculating a constrained distribution tree in a Transparent Interconnect of Lots of Links ("TRILL") network comprising a plurality of virtual local area network labeling ("VL") RBridges and a plurality of fine-grained labeling ("FGL") RBridges, the method comprising:
    supporting a tenant having a higher-order FGL identifier equivalent to an addressable virtual local area network ("VLAN") within the TRILL network;
    learning a respective FGL multi-destination frame filtering capability for each of the FGL RBridges in the TRILL network;
    constructing a sub-graph comprising the FGL RBridges and associated links;
    calculating at least one sub-tree based on the sub-graph;
    constructing a graph comprising one or more of the VL RBridges, and the FGL RBridges and associated links by adding one or more links between the VL RBridges and the FGL RBridges; and
    calculating a constrained distribution tree based on the graph by treating the sub-tree as a logical node, wherein a level of FGL multi-destination frame filtering capability for each FGL RBridge to which a VL RBridge is linked provides sufficient FGL multi-destination frame filtering to prevent security concerns.

2. The method of claim 1, wherein learning a respective FGL multi-destination frame filtering capability for each of the FGL RBridges in the TRILL network further comprises transmitting or receiving a message using a link state protocol, the message comprising an RBridge nickname and a level of FGL multi-destination frame filtering capability associated with an FGL RBridge.

3. The method of claim 1, wherein an FGL RBridge having a first level of FGL multi-destination frame filtering capability is configured to:
    detect a multi-destination FGL frame; and
    discard the multi-destination FGL frame.

4. The method of claim 3, wherein an FGL RBridge having a second level of FGL multi-destination frame filtering capability is configured to:
    detect a multi-destination FGL frame;
    extract a higher-order portion of an FGL header of the multi-destination FGL frame;
    compare the higher-order portion of the FGL header to a VLAN identifier of the addressable VLAN within the TRILL network; and
    if the higher-order portion of the FGL header matches the VLAN identifier, discard the multi-destination FGL frame.

5. The method of claim 4, wherein the sub-graph comprising the FGL RBridges and associated links comprises a single partition, and wherein at least one of the first and second levels of FGL multi-destination frame filtering capability provides sufficient FGL multi-destination frame filtering to prevent security concerns.

6. The method of claim 4, wherein the sub-graph comprising the FGL RBridges and associated links comprises a plurality of partitions, and wherein the second level of FGL multi-destination frame filtering capability provides sufficient FGL multi-destination frame filtering to prevent security concerns.

7. The method of claim 6, further comprising calculating a plurality of sub-trees based on the sub-graph, each sub-tree corresponding to one of the partitions of the sub-graph, wherein calculating a constrained distribution tree based on the graph further comprises treating each of the sub-trees as a logical node.

8. The method of claim 1, further comprising:
  detecting a unicast FGL frame;
  determining at least one of an ingress RBridge and an egress RBridge based on a TRILL header of the unicast FGL frame; and
  if the at least one of the ingress and egress RBridges is a VL RBridge, discarding the unicast FGL frame.

9. A non-transitory computer-readable recording medium having computer-executable instructions stored thereon for calculating a constrained distribution tree in a Transparent Interconnect of Lots of Links ("TRILL") network, the TRILL network comprising a plurality of virtual local area network labeling ("VL") RBridges and a plurality of fine-grained labeling ("FGL") RBridges, that, when executed by an RBridge, cause the RBridge to:
  support a tenant having a higher-order FGL identifier equivalent to an addressable virtual local area network ("VLAN") within the TRILL network;
  learn a respective FGL multi-destination frame filtering capability for each of the FGL RBridges in the TRILL network;
  construct a sub-graph comprising the FGL RBridges and associated links;
  calculate at least one sub-tree based on the sub-graph;
  construct a graph comprising one or more VL RBridges, and the FGL RBridges and associated links by adding one or more links between the VL RBridges and the FGL RBridges; and
  calculate a constrained distribution tree based on the graph by treating the sub-tree as a logical node, wherein a level of FGL multi-destination frame filtering capability for each FGL RBridge to which a VL RBridge is linked provides sufficient FGL multi-destination frame filtering to prevent security concerns.

10. The non-transitory computer-readable recording medium of claim 9, wherein learning a respective FGL multi-destination frame filtering capability for each of the FGL RBridges in the TRILL network further comprises transmitting or receiving a message using a link state protocol, the message comprising an RBridge nickname and a level of FGL multi-destination frame filtering capability associated with an FGL RBridge.

11. The non-transitory computer-readable recording medium of claim 9, wherein an FGL RBridge having a first level of FGL multi-destination frame filtering capability is configured to:
  detect a multi-destination FGL frame; and
  discard the multi-destination FGL frame.

12. The non-transitory computer-readable recording medium of claim 11, wherein an FGL RBridge having a second level of FGL multi-destination frame filtering capability is configured to:
  detect a multi-destination FGL frame;
  extract a higher-order portion of an FGL header of the multi-destination FGL frame;
  compare the higher-order portion of the FGL header to a VLAN identifier of the addressable VLAN within the TRILL network; and
  if the higher-order portion of the FGL header matches the VLAN identifier, discard the multi-destination FGL frame.

13. The non-transitory computer-readable recording medium of claim 12, wherein the sub-graph comprising the FGL RBridges and associated links comprises a single partition, and wherein at least one of the first and second levels of FGL multi-destination frame filtering capability provides sufficient FGL multi-destination frame filtering to prevent security concerns.

14. The non-transitory computer-readable recording medium of claim 12, wherein the sub-graph comprising the FGL RBridges and associated links comprises a plurality of partitions, and wherein the second level of FGL multi-destination frame filtering capability provides sufficient FGL multi-destination frame filtering to prevent security concerns.

15. The non-transitory computer-readable recording medium of claim 14, having further computer-executable instructions stored thereon that, when executed by the RBridge, cause the RBridge to calculate a plurality of sub-trees based on the sub-graph, each sub-tree corresponding to one of the partitions of the sub-graph, wherein calculating a constrained distribution tree based on the graph further comprises treating each of the sub-trees as a logical node.

16. An RBridge in a Transparent Interconnect of Lots of Links ("TRILL") network including a plurality of virtual local area network labeling ("VL") RBridges and a plurality of fine-grained labeling ("FGL") RBridges, comprising:
  a processor; and
  a memory operably coupled to the processor, the memory having computer-executable instructions stored thereon that, when executed by the processor, cause the RBridge to:
    support a tenant having a higher-order FGL identifier equivalent to an addressable virtual local area network ("VLAN") within the TRILL network;
    learn a respective FGL multi-destination frame filtering capability for each of the FGL RBridges in the TRILL network;
    construct a sub-graph comprising the FGL RBridges and associated links;
    calculate at least one sub-tree based on the sub-graph;
    construct a graph comprising one or more VL RBridges, and the FGL RBridges and associated links by adding one or more links between the VL RBridges and the FGL RBridges; and
    calculate a constrained distribution tree based on the graph by treating the sub-tree as a logical node, wherein a level of FGL multi-destination frame filtering capability for each FGL RBridge to which a VL RBridge is linked provides sufficient FGL multi-destination frame filtering to prevent security concerns.

17. The RBridge of claim 16, wherein learning a respective FGL multi-destination frame filtering capability for each of the FGL RBridges in the TRILL network further comprises transmitting or receiving a message using a link state protocol, the message comprising an RBridge nickname and a level of FGL multi-destination frame filtering capability associated with an FGL RBridge.

18. The RBridge of claim 16, wherein an FGL RBridge having a first level of FGL multi-destination frame filtering capability is configured to:
  detect a multi-destination FGL frame; and
  discard the multi-destination FGL frame.

19. The RBridge of claim 18, wherein an FGL RBridge having a second level of FGL multi-destination frame filtering capability is configured to:
  detect a multi-destination FGL frame;
  extract a higher-order portion of an FGL header of the multi-destination FGL frame;
  compare the higher-order portion of the FGL header to a VLAN identifier of the addressable VLAN within the TRILL network; and if the higher-order portion of the FGL header matches the VLAN identifier, discard the multi-destination FGL frame.

20. The RBridge of claim 19, wherein the sub-graph comprising the FGL RBridges and associated links comprises a single partition, and at least one of the first and second levels of FGL multi-destination frame filtering capability provides sufficient FGL multi-destination frame filtering to prevent security concerns; or wherein the sub-graph comprising the FGL RBridges and associated comprises a plurality of partitions, and the second level of FGL multi-destination frame filtering capability provides sufficient FGL multi-destination frame filtering to prevent security concerns.

* * * * *